United States Patent [19]
Tamura

[11] Patent Number: 5,349,382
[45] Date of Patent: Sep. 20, 1994

[54] IMAGE PICKUP APPARATUS WITH IMAGE LIGHT FOCUS PREVENTION

[75] Inventor: Kyoji Tamura, Kawasaki, Japan
[73] Assignee: Canon Kabushiki Kaisha, Tokyo, Japan
[21] Appl. No.: 866,479
[22] Filed: Apr. 10, 1992

[30] Foreign Application Priority Data

Apr. 12, 1991 [JP] Japan .................. 3-079629
Apr. 21, 1991 [JP] Japan .................. 3-079631

[51] Int. Cl.5 .......................................... H04N 5/232
[52] U.S. Cl. ................................ 348/345; 348/347
[58] Field of Search ........ 358/227, 228, 220, 213.19, 358/213.13; 348/345, 347, 358; H04N 5/238

[56] References Cited

U.S. PATENT DOCUMENTS

| | | | |
|---|---|---|---|
| 2,155,486 | 4/1939 | Gunther | 358/220 |
| 3,711,644 | 1/1973 | Ishiguro | 358/220 |
| 3,767,853 | 10/1973 | Bendell et al. | 358/228 |
| 4,410,915 | 10/1983 | Yamamoto | 358/228 |

FOREIGN PATENT DOCUMENTS 1112875 5/1989 Japan .

Primary Examiner—Joseph Mancuso
Assistant Examiner—Wendy R. Greening
Attorney, Agent, or Firm—Fitzpatrick, Cella, Harper & Scinto

[57] ABSTRACT

An image pickup apparatus photoelectrically converts image light from an object. The image light incident on the photosensing plane of the image pickup apparatus is optically controlled by a zoom lens and a focus lens. A controller drives the zoom lens to its telephoto position and drives the focus lens to its closest position so that bright image light is prevented from being focused on the photosensing plane.

5 Claims, 5 Drawing Sheets

IMAGE PICKUP APPARATUS WITH IMAGE LIGHT FOCUS PREVENTION

BACKGROUND OF THE INVENTION

1. Field of the Invention

The present invention relates to an image pickup apparatus which uses an image pickup device such as a video camera, and more particularly to an exposure control therefor.

2. Related Background Art

Iris vanes for directly controlling the amount of light incident onto an image pickup device has usually been used as means for attaining a function called the exposure correction in the video camera. However, in the iris vane approach, the iris vanes and peripheral mechanical components are required and it has been a barrier in attaining small size, small weight and low cost. As one of means for solving the problem, a method for controlling the exposure by an electronic shutter function which controls a charge accumulation time of the image pickup device without using the iris vanes has been proposed.

However, in the exposure control which uses the iris vanes, the iris vanes are in a fully closed position when a power of the image pickup apparatus is turned off so that the incidence of a light to the image pickup device is prevented. On the other hand, when the iris vanes are removed and the exposure control is effected only by the electronic shutter function, the light of the object is always directed to the image pickup device even after the power of the image pickup apparatus is turned off. As a result, if a light from an extremely high brightness object is directed to the image pickup device when the power of the image pickup apparatus is turned on, a large amount of charges are generated in the image pickup device and the charges overflow from pixels and flow into adjacent pixels or vertical transfer areas (blooming phenomenon and smear phenomenon). This results in a very dirty screen.

SUMMARY OF THE INVENTION

In the light of the above problems, it is an object of the present invention to provide an image pickup apparatus which hardly directs an excess amount of light to the image pickup device at the power-on even if the exposure control is effected only by the electron shutter function, and which hardly causes the blooming phenomenon or the smear phenomenon.

In order to solve the above problems and achieve the above object, an image pickup apparatus in one embodiment of the present invention which effects the exposure control by controlling the charge accumulation time of the image pickup device without using the iris means sets a focus position of the imaging lens at a position at which the high brightness object image is not focused to the image pickup device, prior to the start of operation of the image pickup device.

In the embodiment of the image pickup apparatus of the present invention, the position at which the high brightness object image is not focused is a far near position.

In the embodiment of the image pickup apparatus of the present invention, the time prior to the start of operation of the image pickup device is the power-off period.

In the embodiment of the image pickup apparatus of the present invention, the focus position of the imaging lens is moved to the position at which the high brightness object image is not focused after the power-on, and then the power is supplied to the image pickup device.

In another embodiment of the image pickup apparatus of the present invention which effects the exposure control by controlling the charge accumulation time of the image pickup device without using the iris means moves a zoom position of the imaging lens toward a narrow view field prior to the start of operation of the image pickup device.

In the embodiment of the image pickup apparatus of the present invention, the time before the start of operation of the image pickup device is the power-off period.

In the embodiment of the image pickup apparatus of the present invention, the zoom position of the imaging lens is moved toward narrow view field after the power-on and then the power is supplied to the image pickup device.

In accordance with the embodiment of the image pickup apparatus of the present invention, a light from a high brightness object is hardly directed to the image pickup device immediately after the power-on of the image pickup apparatus, and even if it is directed, the image of the high brightness object is defocused on the image pickup device. Thus, a light intensity directed to each pixel is low and the blooming phenomenon or the smear phenomenon is hard to occur.

In order to solve the above problems and achieve the above objects, a drive method for the image pickup device in accordance with other embodiment of the present invention which controls the exposure by controlling the charge accumulation time T of the image pickup device without using the iris means, varies the charge accumulation time T from near zero to a proper accumulation time gradually at the power-on of the image pickup device.

In the embodiment of the drive method for the image pickup device of the present invention, the accumulation for a predetermined time period t3 is discretely conducted a predetermined times n so that the accumulation time T=t3×n.

In the embodiment of the drive method for the image pickup device of the present invention, the predetermined time t3 is varied so that the accumulation time T varies from near zero to a proper accumulation time gradually.

In the embodiment of the drive method for the image pickup device of the present invention, the predetermined number of times n is varied so that the accumulation time T varies from near zero to the proper accumulation time gradually.

In the embodiment of the drive method for the image pickup device of the present invention, the accumulation is conducted once continuously to attain the accumulation time T.

In accordance with the embodiment of the drive method for the image pickup device of the present invention, the accumulation time of the image pickup device is short immediately after the power-on of the image pickup device to suppress the generation of charges in the pixels, and the accumulation time is thereafter gradually approaches to the proper accumulation time. Accordingly, even if a light from a high brightness object is directed to the image pickup device immediately after the power-on, the blooming phenomenon or the smear phenomenon is head to occur. As a result, the exposure of the image varies in a natural manner at the power-on even if the iris vane mechanism is eliminated.

Other objects and features of the present invention will be apparent from the following description and the accompanying drawings.

DETAILED DESCRIPTION OF THE PREFERRED EMBODIMENTS

In the following embodiment, a multi-exposure method proposed by the assignee of the present invention in Japanese Patent Application No. 2-291818 is used as a method for controlling the charge accumulation time of the image pickup device.

Before specific explanation of the embodiment, the multi-exposure operation is generally described.

Figure 1:
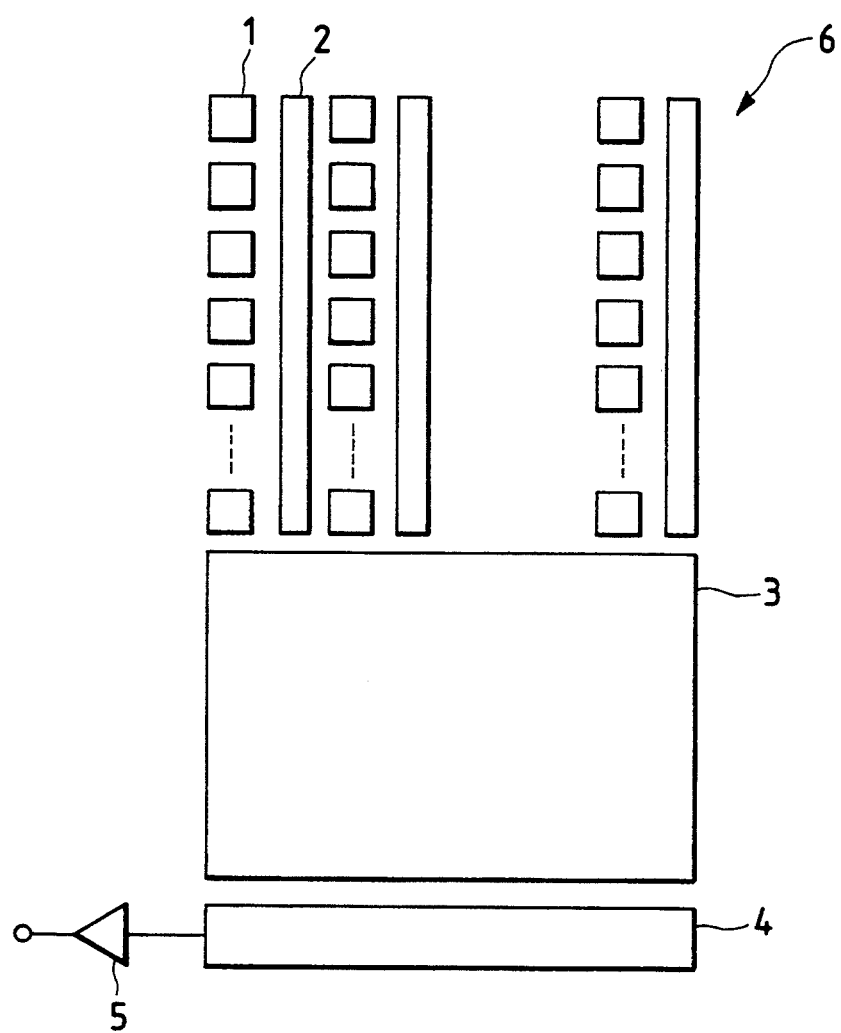
FIG. 1 shows a construction of an image pickup device.

FIG. 1 shows a conceptual view of a CCD sensor used in the multi-exposure operation of the embodiment. The CCD sensor 6 is a frame interline transfer type CCD. Numeral 1 denotes a sensor unit for photoelectric conversion. Charges generated in the sensor unit 1 are transferred to a vertical transfer register 2, then to a memory 3 during a vertical flyback period, and then to a horizontal transfer register 4 at a predetermined timing, and read out through an output amplifier 5.

Figure 2:
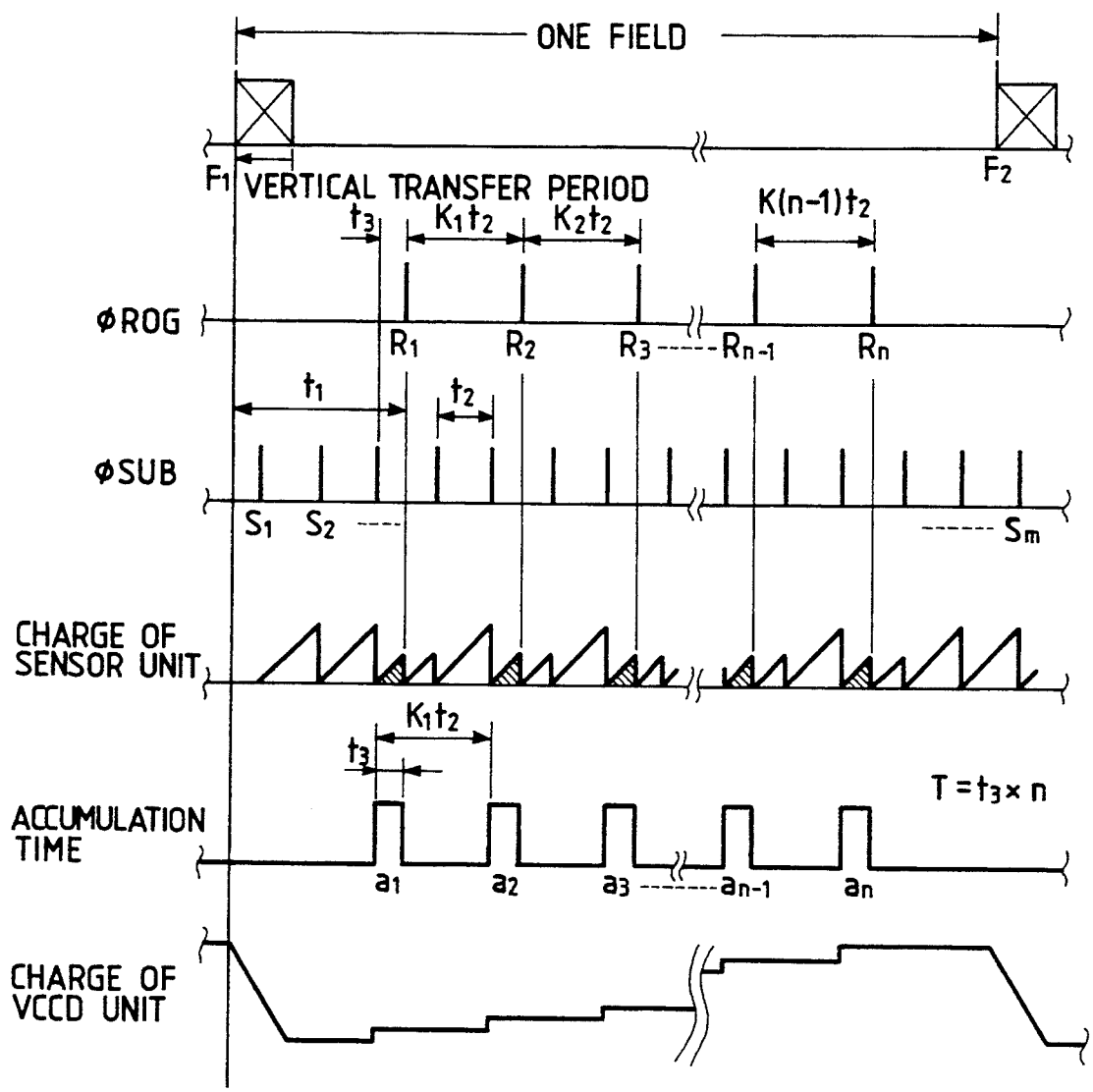
FIG. 2 shows a time chart of a multi-exposure operation using the image pickup device of FIG. 1.

FIG. 2 illustrates a normal multi-exposure operation using the CCD sensor 6. A drive method for controlling the exposure by the CCD sensor 6 itself without using the iris vane mechanism is explained below.

At a time F1, the charges stored in the sensor unit 1 until that time are transferred from the sensor unit 1 to the vertical transfer register 2, and one field of charges are transferred from the vertical transfer register 2 to the memory 3 at a high speed during a vertical flyback period (a vertical transfer period in FIG. 2). Then, elimination pulses $\phi$SUB are activated m times per field at an interval t2 (S1, S2, S3 ..., Sm) so that the charges stored in the sensor unit 1 are swept out at each generation of the elimination pulses $\phi$SUB.

Transfer pulses $\phi$ROG are activated starting from a midway of one field after the time F1 at pulse intervals of $K1 \times t2$, $K2 \times t2$ ..., $K(n-1) \times t2$ (where K1, K2 ..., K(n-1) are positive integers), (R1, R2, R3, Rn). A time difference between the elimination pulse $\phi$SUB and the transfer pulse $\phi$ROG immediately before the first pulse R1 is given by t3, which corresonds to actual accumulation times a1, a2, a3, an of the sensor. Total charge generated in the sensor unit 1 during n divided accumulation times a1, a2, a3 ..., an in one field period, that is, the charges accumulated in the accumulation time $T = t3 \times n$ are summed in the vertical transfer register 2, and they are transferred to the memory 3 in one time at a high speed.

In the above multi-exposure operation, since the accumulation times a1, a2 ..., an are evenly and discretely distributed in one field period, the exposure can be controlled by the CCD sensor 6 in a natural manner without feeling of change in dynamic resolution.

An embodiment for the above multi-exposure is now explained.

Figure 3:
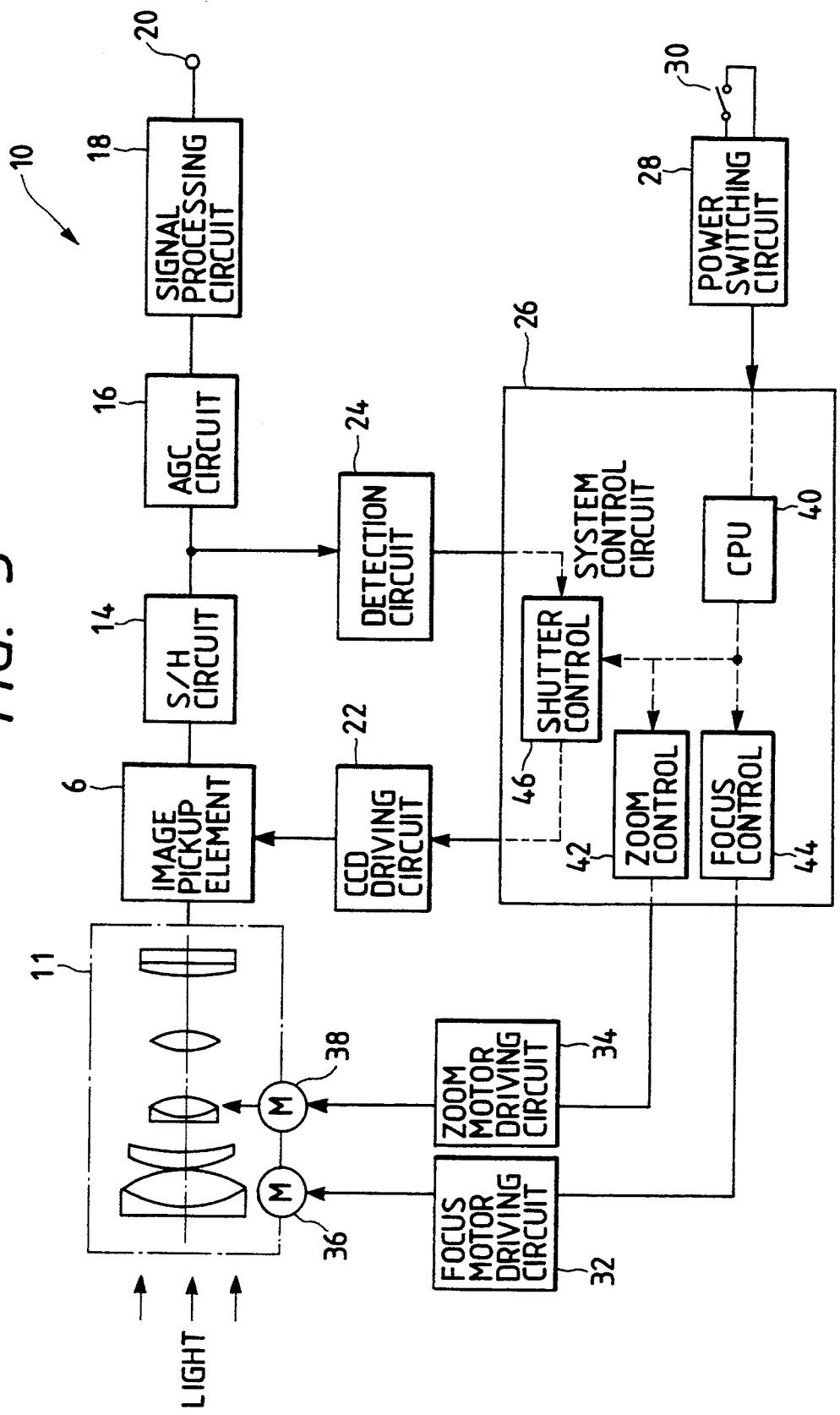
FIG. 3 shows a block diagram of a configuration of an embodiment of the present invention.

FIG. 3 shows a block diagram of a configuration of one embodiment of the image pickup apparatus.

Numeral 11 denotes an imaging lens for focusing a light of an object onto an image pickup device 6 as shown in FIG. 1, and comprises a focusing lens and a variator lens for changing a magnification. Numeral 6 denotes the image pickup device for converting the light focused by the imaging lens 11 to charges. An output signal of the image pickup device 6 is sampled by a S/H circuit 14, converted to a standard television signal by an AGC circuit 16 and a signal processing circuit 18, and outputted from an output terminal 20 to the external of the image pickup apparatus 10. The image pickup device 6 is connected to an image pickup device drive circuit 22 which is connected to a system control circuit 26 for controlling an overall operation of the image pickup apparatus 10. The output of the S/H circuit 14 is supplied to the AGC circuit 16 and a detection circuit 24 as well, and an output signal of the detection circuit 24 is supplied to the system control circuit 26. A power switch circuit 28 is connected to the system control circuit and a power switch 30 is connected to the power switch circuit 28. As the power switch 30 is turned on and off, the on/off information of the power switch 30 supplied from the power switch circuit 28 to the system control circuit 26. A CPU 40 in the system control circuit detects the on/off information of the switch 30 to control the drive of a zoom control circuit 42, a focus control circuit 44 and a shutter control circuit 46.

On the other hand, a focus motor 36 is connected to the focusing lens in the imaging lens 11, and the focus motor 36 is connected to a focus motor drive circuit 32. A zoom motor 38 is connected to the variator lens and the zoom motor 38 is connected to a zoom motor drive circuit 34. The focus motor drive circuit 32 and the zoom motor drive circuit 34 are connected to the system control circuit 26.

In the exposure control by the electronic shutter function without the iris vanes, the output signal of the S/H circuit 14 is detected by the detection circuit 24, the output signal of the detection circuit 24 is compared with a reference for a proper exposure in the system control circuit 26, and the image pickup device drive circuit 22 is controlled in accordance with the comparison result to change the charge accumulation time of the image pickup device 6.

An operation of the image pickup apparatus 10 at the power-off is explained below.

When an operator switches the power switch 30 of the image pickup apparatus 10 from ON to OFF, the power switch circuit 28 supplies to the system control circuit 26 a signal indicating the turn-off of the power switch 30. When the CPU 40 of the 10 system control circuit 26 receives the signal indicating the turn-off of the power switch 30, it causes the zoom control circuit 42 and the focus control circuit 44 to control the focus motor drive circuit 32 and the zoom motor drive circuit 34 so that the focusing lens is driven to a near end and the variator lens is driven to a telescope end. Then, it activates the power switch circuit 28 to turn off the entire power of the image pickup apparatus 10.

By driving the variator lens to the telescope end at the power-off, an image angle of the imaging lens 11 is narrowed (a view field is narrowed). Accordingly, a probability of incidence of a high brightness object into the image angle at the power-on is lowered and there is a less chance of irradiation of the image pickup device 6 by the excess light. Since the aperture of the imaging lens 11 is small at the telescope end, the chance of incidence of the excess light to the image pickup device is further less. Even if a high brightness object is within the image angle at the power-on, the image of the high brightness object is defocused because the focusing lens is at the near end where the depth of object view field is shallow. As a result, it does not happen that the light of the high brightness object is directed to the image pickup device as a spot but the light is dispersed to many pixels. Accordingly, the blooming phenomenon or the smear phenomenon can be suppressed.

By driving the zoom position of the imaging lens 11 to the telescope end and the focus position to the near end at the power-off of the image pickup apparatus, the light of the high brightness object is hard to be directed to the image pickup device 12 when the image pickup apparatus 10 is later powered on, and the blooming phenomenon and the smear phenomenon are suppressed. Even if the light of the high brightness object is directed to the image pickup device at the power-on, the blooming phenomenon and the smear phenomenon are suppressed because the image of the object is hard to be focused on the image pickup device 6.

The present embodiment may be modified or varied without departing from the spirit of the present invention.

For example, in the present embodiment, the positions of the focusing lens and the variator lens are controlled at the power-off of the image pickup apparatus. Alternatively, the variator lens may be driven to the telescope end and the focusing lens may be driven to the near end as they are in the above embodiment, at the power-on of the image pickup apparatus and prior to the power-on of the image pickup device, that is, prior to the start of operation.

In accordance with the present embodiment of the image pickup apparatus, the light of the high brightness object is hard to be directed to the image pickup device immediately after the power-on, and even if it is directed, the image of the high brightness object is defocused on the image pickup device. Thus, the light intensity to each pixel is small and the blooming phenomenon or the smear phenomenon is hard to occur.

Figure 4:
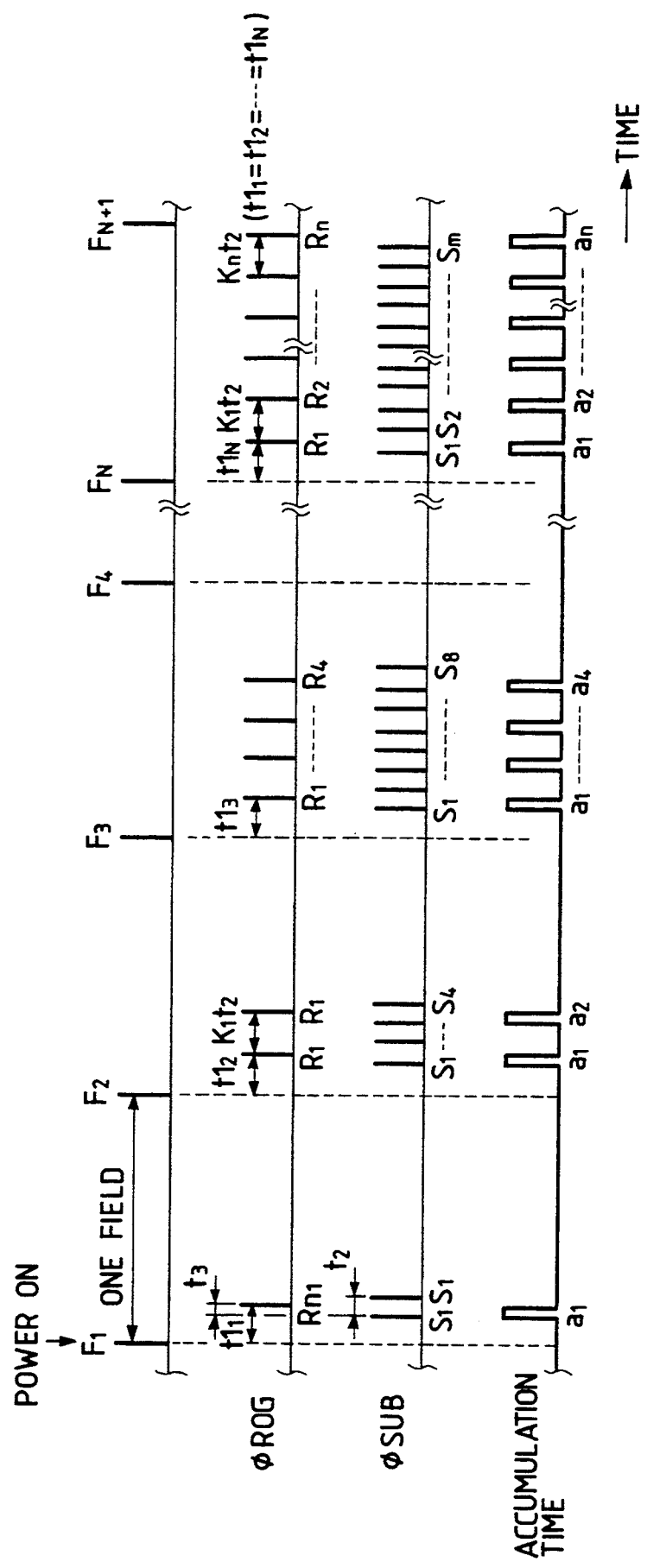
FIG. 4 shows a time chart of an operation of an embodiment of a drive method of the present invention.

A drive method for the image pickup apparatus shown in FIG. 3 is now explained. FIG. 4 illustrates an operation at the power-on in the present embodiment.

In the present embodiment, the number of times n of transferring charges in one field (the number of times of accumulation) after the power-on of the image pickup apparatus at the time F1 is controlled, with t1 and t2 in FIG. 2 being kept constant, by the control by the CPU 40 and the shutter control circuit 46. Immediately after the power-on, the number of times n of accumulation in one field period is set to 1 and the number of times n is subsequently increased gradually. Thus, the accumulation time T $(T-t3 \times n)$ which is a sum of the accumulation times t3 in the accumulation periods a1, a2 ..., an gradually increases from near zero and gradually approaches to a proper exposure. Accordingly, an exposure status of the image changes in a natural manner.

Figure 5:
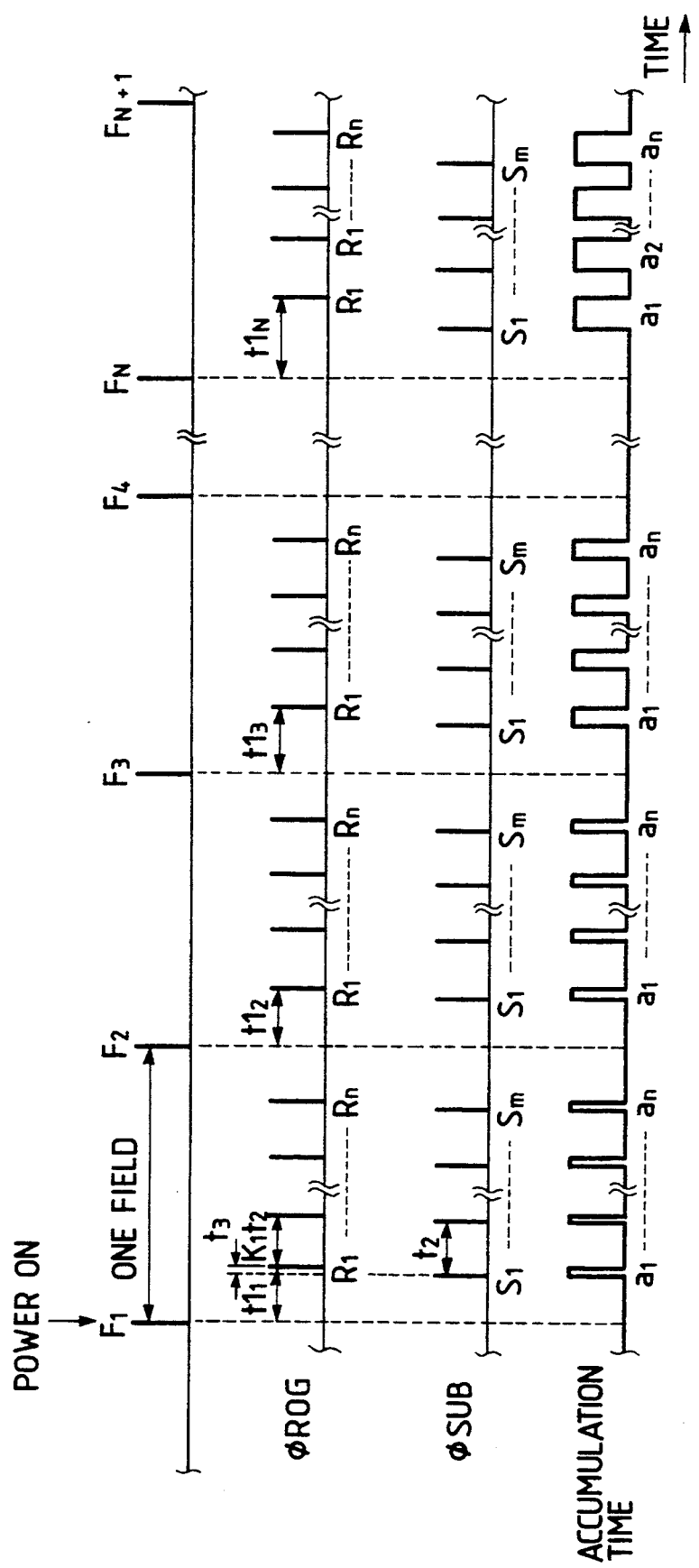
FIG. 5 shows a time chart of an operation of the embodiment of the drive method of the present invention.

FIG. 5 shows a timing chart of an operation of other embodiment. In the present embodiment, t2 in FIG. 2 and the number of times n of accumulation are kept constant and t1 is changed to change t3 as a consequence. After the power-on, the accumulation time T which is the sum of the accumulation times t3 in the accumulation periods a1, a2 ..., an gradually increases from near zero and gradually approaches to the proper exposure as it does in the above embodiment. The same effect as that of the previous embodiment is attained.

All of t1, t2 and n may be changed to attain the same effect.

The above embodiment may be modified or varied without departing from the spirit of the present invention.

For example, in the above embodiment, the exposure control is effected by the multi-exposure operation alternatively, the accumulation may be done continuously for the time T in one time.

In accordance with the drive method for the image pickup device of the present invention, the accumulation time of the image pickup device is short immediately after the power-on of the image pickup device to suppress the generation of the charges in the pixels, and the accumulation time is subsequently gradually approached to the proper accumulation time. Accordingly, even if the light of the high brightness object is directed to the image pickup device at the power-on, the blooming phenomenon or the smear phenomenon is hard to occur. Thus, the exposure status of the image changes in a natural manner at the power-on even if the iris vane mechanism is eliminated.

What is claimed is:

1. An image pickup apparatus comprising:
   (a) image pickup means for photo-electrically converting image light from an object;
   (b) focusing means for focusing; and
   (c) control means for inhibiting the image light from being focused on the photo-sensing plane of said image pickup means for a predetermined period by controlling said focusing means after said image pickup apparatus is powered.

2. An image pickup apparatus according to claim 1, wherein said focusing means defocuses the image on the photo-sensing plane by focusing on a closest object.

3. An apparatus according to claim 1, wherein said focusing means is included in a zoom lens.

4. An apparatus according to claim 3, wherein said control means prevents focusing by said focusing means, by driving the zoom lens.

5. An apparatus according to claim 4, wherein said control means prevents the focusing by said focusing means, by setting the zoom lens in zoom up state.

* * * * *

UNITED STATES PATENT AND TRADEMARK OFFICE
CERTIFICATE OF CORRECTION

PATENT NO. : 5,349,382
DATED : September 20, 1994
INVENTOR(S) : KYOJI TAMURA

It is certified that error appears in the above-identified patent and that said Letters Patent is hereby corrected as shown below:

ON THE TITLE PAGE

At [30] Foreign Application Priority Data
        "Apr. 21, 1991 [JP] Japan 3-079631" should
        read --Apr. 12, 1991 [JP] Japan 3-07963--.

At [56] under FOREIGN PATENT DOCUMENTS "1112875" 5/1989
        Japan" should read --1-112875 5/1989 Japan--.

COLUMN 2

Line 63, "approaches" should read --approached--.
   Line 67, "head" should read --hard--.

COLUMN 3

Line 62, "a3," should read --a3, ...,--.

COLUMN 4

Line 62, "10" should be deleted.

Signed and Sealed this

Fourteenth Day of February, 1995

Attest:

BRUCE LEHMAN

Attesting Officer    Commissioner of Patents and Trademarks